United States Patent Office 3,484,494
Patented Dec. 16, 1969

3,484,494
CATALYTIC PROCESS FOR THE MANUFACTURE OF ALKYL HALIDES AND CATALYSTS THEREFOR
Samuel Corbett Carson, Runcorn, England, assignor to Imperial Chemical Industries Limited, London, England, a corporation of Great Britain
No Drawing. Filed Apr. 10, 1967, Ser. No. 629,430
Claims priority, application Great Britain, Apr. 21, 1966, 17,493/66
Int. Cl. C07c *17/36*
U.S. Cl. 260—657                                                    7 Claims

ABSTRACT OF THE DISCLOSURE

Preparation of impregnated alumina catalysts suitable for use in production of alkyl chlorides or bromides by interaction of hydrogen chloride of hydrogen bromide with the corresponding alkanol or a dialkyl ether thereof.

---

This invention relates to impregnated alumina catalysts and the use thereof in a vapour-phase catalytic process for the manufacture of alkyl chlorides and alkyl bromides.

It is known that alkyl chlorides and alkyl bromides may be prepared by the interaction of hydrogen chloride or hydrogen bromide respectively with the corresponding alkanol (for example methanol) or a dialkyl ether thereof (for example dimethyl ether) in the vapour-phase in the presence of alumina as catalyst. Such known processes are capable of giving a high degree of conversion of the alkanol or dialkyl ether thereof into the alkyl chloride or alkyl bromide over relatively short periods of operation but physical breakdown of the catalyst and/or loss of activity of the catalyst occur over the long periods of operation which are desirable on a commercial scale.

I have now found that improved catalysts may be obtained by impregnating alumina with certain metal salts and heating the impregnated catalyst to a temperature in the range from 300° C. to 600° C. for a period of at least 2 hours.

Thus according to one aspect of the present invention there is provided a process for the preparation of a catalysts which comprises impregnating alumina with at least one chloride of the group consisting of potassium, manganese, cobalt, molybdenum, nickel, copper, cadium or thorium chlorides (or a compound giving rise thereto under reaction conditions) and heating the impregnated catalyst to a temperature in the range 300° C. to 600° C. for a period of at least 2 hours.

According to another aspect of the present invention there is provided a process for the manufacture of an alkyl chloride or an alkyl bromide which comprises interacting hydrogen chloride or hydrogen bromide respectively with the corresponding alkanol (or a dialkyl ether thereof), in the vapour phase at an elevated temperature in the presence of a catalyst obtained by impregnating alumina with at least one chloride of the group consisting of potassium, manganese, cobalt, molybdenum, nickel, copper, cadmium, and thorium chlorides (or a compound giving rise thereto under reaction conditions), the said catalyst having been heated to a temperature in the range 300° C. to 600° C. for a period of at least 2 hours.

It is preferred to impregnate the alumina with potassium chloride together with at least one chloride of the group consisting of manganese, cobalt and nickel chlorides: it is especially preferred to use potassium chloride together with manganese cholride.

The proportion of impregnants incorporated in the catalyst many vary over a wide range but it is generally preferred to use from 2 to 30 parts by weight of total chloride impregnants per 100 parts by weight of alumina. It is especially preferred to use from 2 to 15 parts by weight of potassium chloride, together with from 2 to 15 parts by weight of manganese chloride, cobalt chloride or nickel chloride.

The alumina to be impregnated preferably has a mean pore radius of at least 20 A. Impregnation may be carried out by standard techniques, for example by stirring the alumina with an aqueous solution of the impregnant materials, followed by removal of the excess solution; the impregnated catalyst may then be dried and subjected to heat treatment at 300° C. to 600° C.

The period of heating of the catalyst is preferably at least 12 hours, for example from 50 to 150 hours. The catalyst is preferably heated to a temperature in the range from 400° C. to 500° C.

It is preferred to maintain a stream of an inert gas, for example nitrogen, over the catalyst during the said period of heating.

The resulting catalyst may be used either in a fixed bed or in a fluidised bed.

As in known processes, the proportion of hydrogen chloride or hydrogen bromide and the alkanol (or a dialkyl ether thereof) in the reactant gases may vary widely but it is preferred to maintain a slight molar excess of hydrogen chloride or hydrogen bromide, for example from 1.05 to 1.15 moles of hydrogen chloride or hydrogen bromide per mole of alkanol or from 2.05 to 2.30 moles of hydrogen chloride or hydrogen bromide per mole of a dialkyl ether thereof.

The reaction temperature is preferably maintained in the range 250° C. to 400° C. The optimum reaction temperature and "space velocity" depend upon the particular reactants and catalysts employed; in general, preferred "space velocities" are those in the range from 500 to 3000 hour$^{-1}$ (calculated from the total volume of reactant gases, measured at N.T.P., and the volume of the catalyst bed).

The reaction is conveniently carried out at substantially atmospheric pressure but higher or lower pressures may be used.

The process is applicable in particular to the manufacture of methyl chloride from methanol and hydrogen chloride but is also applicable to the preparation of other alkyl chlorides and of alkyl bromides (for example those containing from 2 to 4 carbon atoms) from the corresponding alkanol or a dialkyl ether thereof.

The invention is illustrated, but no limited, by the following examples.

EXAMPLE 1

A commercially available activated alumina (4–8 B.S.S. granules, having surface area approximately 275 m.$^2$/g., pore volume 0.5 ml./g. and mean pore radius 36 A.) was impregnated with a solution of potassium chloride and manganese chloride to give an impregnated catalyst containing 5 parts by weight of potassium chloride and 10 parts by weight of manganese chloride per 100 parts by weight of alumina. The impregnated catalyst was heated at 450° C. in a stream of nitrogen for 100 hours and the treated catalyst was sieved to remove material below 8 B.S.S. mesh size.

A mixture of methanol vapour and hydrogen chloride was pre-heated to 200° C. and passed downwards through a 6-inch bed of the catalyst in a 1-inch bore glass tube heated in a furnace maintained at 220° C. The flow-rate of hydrogen chloride was 27 l./hour and the flow-rate of methanol was 25 l./hour, corresponding to a space velocity of 780 hour$^{-1}$.

The temperature of the catalyst bed rose, owing to the heat of reaction: the maximum temperature reached was 330° C. at a short distance from the inlet end of the bed.

After 950 hours the highest temperature within the bed was 326° C., the molar conversion of methanol into methyl chloride was 95% and the molar conversion of methanol into dimethyl ether was 1%. After 1300 hours the temperature was 319° C., the conversion into methyl chloride was 93% and the conversion into dimethyl ether was 1.4%. At the end of the 1300 hours period the physical breakdown of the catalyst, measured by the proportion of "fines" passing through an 8 B.S.S. mesh sieve, was 0.16% by weight; the catalyst contained 1.57% by weight of carbon.

By way of comparison, when un-impregnated alumina was used under similar conditions for a period of only 188 hours, the breakdown was 2% by weight and the alumina contained 1.54% by weight of carbon.

EXAMPLE 2

The activated alumina described in Example 1 was impregnated with an aqueous solution of potassium chloride to give an impregnated catalyst containing 10 parts by weight of potassium chloride per 100 parts by weight of alumina. The impregnated catalyst was heated at 450° C. and sieved as described in Example 1.

Methanol vapour and hydrogen chloride were passed through a bed of the treated catalyst under the conditions described in Example 1. The maximum temperature reached within the bed was 330° C. After 900 hours, the maximum temperature was 326° C., the molar conversion of methanol into methyl chloride was 93% and the molar conversion of methanol into dimethyl ether was 1%.

After 1030 hours the flow was interrupted and the catalyst was removed for examination. The physical breakdown at this stage, measured by the proportion of "fines" passing through an 8 B.S.S. mesh sieve, was 3.7% by weight.

The "fines" were discarded and the remainder of the catalyst was used for a further period. After a total 2000 hours of flow the conversion into methyl chloride was 91.5% and the conversion into dimethyl ether was 1%. At the end of this period the catalyst contained 1% by weight of carbon.

EXAMPLE 3

The activated alumina described in Example 1 was impregnated with an aqueous solution of cadmium chloride to give an impregnated catalyst containing 15 parts by weight of cadmium chloride per 100 parts by weight of alumina. The impregnated catalyst was heated at 450° C. and sieved as described in Example 1.

Methanol vapour and hydrogen chloride were passed through a bed of the treated catalyst under the conditions described in Example 1. The maximum temperature reached within the bed was 334° C. After 920 hours the maximum temperature was 322° C., the molar conversion of methanol into methyl chloride was 97% and the molar conversion of methanol into dimethyl ether was 1.4%. The physical breakdown at this stage, measured by the proportion of "fines" passing through an 8 B.S.S. mesh sieve, was 1.0% by weight.

The "fines" were discarded and the remainder of the catalyst was used for a further period. After a further 955 hours the further breakdown of the catalyst was 1.5% by weight; at the end of this further period the maximum temperature was 314° C. and the conversion into methyl chloride was 95%.

EXAMPLE 4

The activated alumina (as described in Example 1 except that the size of the granules was 8–14 B.S.S.) was impregnated with an aqueous solution of potassium chloride and manganese chloride to give an impregnated catalyst containing 5 parts by weight of potassium chloride and 10 parts by weight of manganese chloride per 100 parts by weight of alumina. The impregnated catalyst was heated to 450° C. and sieved to remove material below 14 B.S.S. mesh size.

A mixture of dimethyl ether vapour and hydrogen chloride was passed downwards through the bed (of the same dimensions as described in Example 1) of treated catalyst, the furnace being maintained at 292° C. The flow-rate of hydrogen chloride was 50 l./hour and the flow-rate of dimethyl ether was 24 l./hour, corresponding to a space velocity of 1100 hour$^{-1}$. The maximum temperature reached in the bed was 384° C.

After establishment of steady state conditions, the yield of methyl chloride from dimethyl ether was 93 mole percent.

EXAMPLE 5

The impregnated activated alumina catalyst containing 5 parts by weight of potassium chloride and 10 parts by weight of manganese chloride per 100 parts by weight of alumina was prepared as described in Example 4.

A mixture of ethanol vapour and hydrogen chloride was preheated to 180° C. and passed downwards through the bed (of the same dimensions as described in Example 1) of treated catalyst, the furnace being maintained at 255° C. The flow-rate of hydrogen chloride was 55 l./hour and the flow-rate of ethanol was 45 l./hour, corresponding to a space velocity of 1500 hour$^{-1}$. The maximum temperature reached in the bed was 312° C.

After establishment of steady state conditions, the yield of ethyl chloride from ethanol was 88 mole percent.

EXAMPLE 6

The impregnated activated alumina catalyst containing 5 parts by weight of potassium chloride and 10 parts by weight of manganese chloride per 100 parts by weight of alumina was prepared as described in Example 4.

A mixture of methanol vapour and hydrogen bromide was preheated to 180° C. and passed downwards through the bed (of the same dimensions as described in Example 1) of treated catalyst, the furnace being maintained at 255° C. The flow-rate of hydrogen bromide was 65 l./hour and the flow-rate of methanol was 45 l./hour, corresponding to a space velocity of 1650 hour$^{-1}$. The maximum temperature reached in the bed was 350° C.

After establishment of steady state conditions, the yield of methyl bromide from methanol was 100 mole percent.

What I claim is:

1. A process for the production of an alkyl chloride or an alkyl bromide having 1 to 4 carbon atoms which comprises interacting hydrogen chloride or hydrogen bromide with the corresponding alkanol or dialkyl ether thereof in the vapour phase at a temperature in the range 250° C. to 400° C. in the presence of a catalyst prepared by impregnating alumina with at least one chloride of the group consisting of potassium, manganese and cadmium chlorides, the said catalyst having been heated before use at a temperature in the range 300° C. to 600° C. for a period of at least two hours.

2. A process as claimed in claim 1 wherein the proportion of impregnants is from 2 to 30 parts by weight of the total chloride impregnants per 100 parts by weight of alumina.

3. A process as claimed in claim 1 wherein the alumina is impregnated with potassium chloride and manganese chloride.

4. A process as claimed in claim 1 in which the alumina has a mean pore radius of at least 20 A.

5. A process as claimed in claim 1 in which the impregnated catalyst is heated to a temperature in the range from 300° C. to 600° C. for a period of at least 12 hours.

6. A process as claimed in claim 1 in which the impregnated catalyst is heated to a temperature in the range from 400° C. to 500° C.

7. A process as claimed in claim 1 wherein the impregnated catalyst is heated in an atmosphere of inert gas.

References Cited

UNITED STATES PATENTS

| 1,738,193 | 12/1929 | McKee et al. | 260—657 |
| 1,834,089 | 12/1931 | Carlisle | 260—657 |
| 1,920,246 | 8/1933 | Daudt | 260—657 |
| 1,920,846 | 8/1933 | Daudt | 260—657 |
| 2,442,285 | 5/1948 | Cheney | 260—657 |

DANIEL D. HORWITZ, Primary Examiner

U.S. Cl. X.R.

252—441